Jan. 31, 1933.   H. G. KELLOGG   1,895,572
HINGE
Filed March 16, 1931
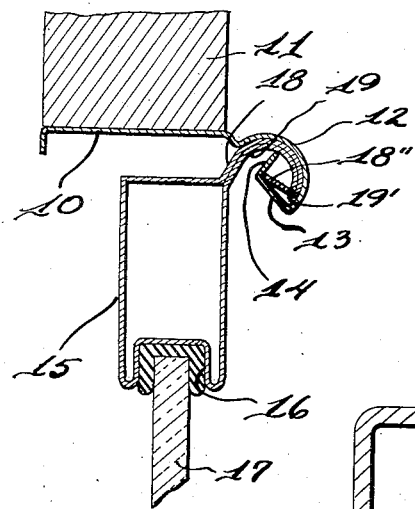
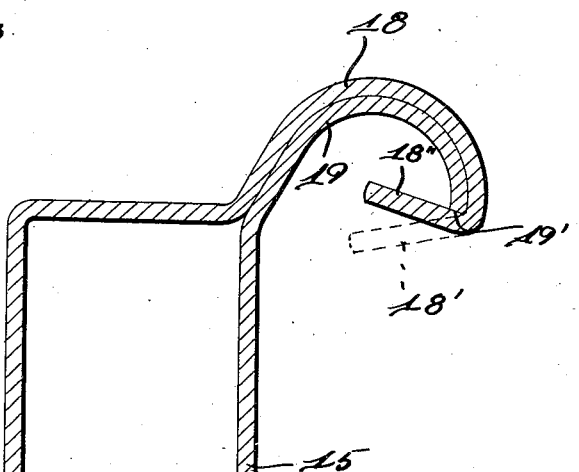
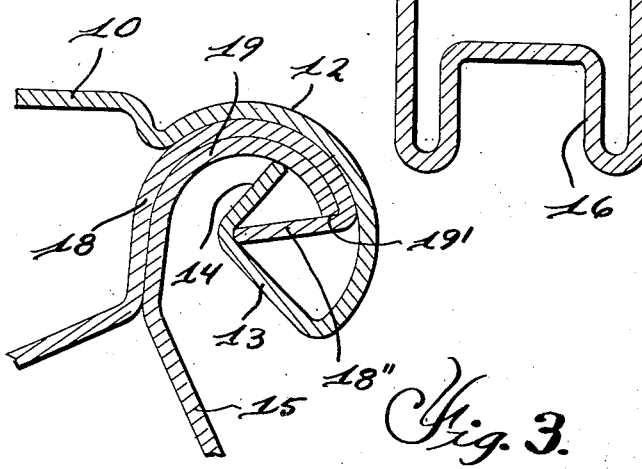
INVENTOR
Homer G. Kellogg
BY
Whittemore Hulbert Whittemore & Belknap
ATTORNEYS Patented Jan. 31, 1933

1,895,572

UNITED STATES PATENT OFFICE

HOMER G. KELLOGG, OF DETROIT, MICHIGAN, ASSIGNOR TO MOTOR PRODUCTS CORPORATION, OF DETROIT, MICHIGAN, A CORPORATION OF NEW YORK

HINGE

Application filed March 16, 1931. Serial No. 523,073.

This invention relates to frames and hinges and more particularly to a frame and hinge structure for windshields and the like.

The invention has as one of its important objects to provide a frame member for windshields and the like formed of sheet metal in which the lock seam of the frame member is shaped to provide one of the hinged parts of a bead type hinge structure in which the beads are adapted for interfitting pivotal engagement.

The bead hinge structure is similar to the type of hinge described and claimed in my prior Patent No. 1,666,211 dated April 17, 1928.

The several objects, advantages and novel details of construction of the invention will be made more apparent as this description proceeds, especially when considered in connection with the accompanying drawing wherein Figure 1 is a fragmentary vertical sectional view showing one application of my invention, the same being shown in connection with a windshield;

Figure 2 is an enlarged sectional view through the frame member and hinge part, and Figure 3 is an enlarged fragmentary sectional view through the hinge parts with the parts in a different position from that illustrated in Figure 1.

If the structure described and claimed herein is to be used in connection with a windshield or the like, there is provided a hinge part 10 secured to the header bar 11 or some other stationary part of the vehicle. The hinge part 10 is provided with a bead 12 substantially semi-circular in cross section, this bead terminating in an inturned edge portion 13 having a substantially right angularly bent extremity 14.

The reference character 15 indicates a frame member of, for instance, a windshield or the like formed of sheet metal and shaped to provide a groove 16 to receive the windshield glass 17. The frame member 15 is of a hollow construction as illustrated, and the free edges 18 and 19 thereof are brought together in superposed relation to form a substantially laminated structure. These superposed edges are then bent to form a hinge bead part extending longitudinally of the frame, the bead being substantially arc-shape in cross section as illustrated. The edge of the wall portion 18 extends beyond the edge of the portion 19 as illustrated, for instance, in dotted lines at 18' in Figure 2. Subsequently this edge portion is bent inwardly as shown at 18" to overlie the outer edge face 19' of the wall 19. This extremity of the wall portion 18 in being bent inwardly as illustrated, engages the edge face 19' and presses the arcuate bead 19 into firm engagement with the bead 18 and thus provides a lock seam or joint for the free edges of the frame member. Thus the structure not only units the edges of the frame member, but provides a hinge bead part adapted for interfitting pivotal engagement with the bead 12 as illustrated in Figures 1 and 3. This extension 18" of the frame member hinge part cooperates with the extremity 14 of the outer hinge part 12 to hold the hinge parts firmly in contact with one another during the relative angular movement of these hinge parts, as best seen by a comparison of Figures 1 and 3.

It will be obvious that the herein described hinge and frame structure may be employed for hingedly supporting other parts than a windshield and moreover the various nonessential details of the structure may be changed without departing from the spirit and scope of the invention as defined in the appended claims.

What I claim as my invention is:

1. A frame member or the like formed of sheet metal and having two longitudinal edges, said edges being superposed on one another and bent to form a bead substantially arc-shape in cross section, one of the edges extending beyond the other and being inturned to lock said edges together.

2. A hinge comprising a pair of hinge parts each having a bead formed thereon for interfitting pivotal engagement, one of said beads being formed of a laminated structure with the edge of one of the laminations thereof extending beyond and bent inwardly to hold the laminations together.

3. A sheet metal frame member having a longitudinally extending bead arc-shape in cross section formed by shaping the longitudinal free edges of the frame member, one of said edges being extended and bent to overlie the other edge to form a lock seam and to hold said bead portions together.

4. A combined frame member and hinge part for windshields and the like, formed of a single sheet of metal bent to form the frame member with the longitudinal edges bent to form a bead constituting a hinge part and adapted for interfitting pivotal engagement with a companion part, one of said longitudinal edges being extended beyond the other and bent inwardly to overlie the other, for the purpose set forth.

5. A sheet metal frame member having its longitudinal edges superposed and shaped to form a locked seam, said seam being in the form of a hinge bead part adapted for interfitting pivotal engagement with a companion bead carried by another hinge part.

In testimony whereof I affix my signature.

HOMER G. KELLOGG.